(12) United States Patent
Tsai et al.

(10) Patent No.: US 10,739,630 B2
(45) Date of Patent: Aug. 11, 2020

(54) TOUCH DISPLAY PANEL AND TOUCH DISPLAY DEVICE

(71) Applicant: Wuhan China Star Optoelectronics Technology Co., Ltd., Wuhan, Hubei (CN)

(72) Inventors: Yucheng Tsai, Guangdong (CN); Zhou Zhang, Guangdong (CN); Pan Xu, Guangdong (CN); Changwen Ma, Guangdong (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/753,929

(22) PCT Filed: Jan. 4, 2018

(86) PCT No.: PCT/CN2018/071349
§ 371 (c)(1),
(2) Date: Nov. 6, 2018

(87) PCT Pub. No.: WO2019/085251
PCT Pub. Date: May 9, 2019

(65) Prior Publication Data
US 2019/0129216 A1 May 2, 2019

(30) Foreign Application Priority Data

Oct. 31, 2017 (CN) .......................... 2017 1 1053731

(51) Int. Cl.
G02F 1/1333 (2006.01)
G02F 1/1362 (2006.01)
(Continued)

(52) U.S. Cl.
CPC .... *G02F 1/13338* (2013.01); *G02F 1/136209* (2013.01); *G06F 3/044* (2013.01); *G06F 3/0412* (2013.01); *G06F 3/0416* (2013.01)

(58) Field of Classification Search
CPC . G02F 1/13338; G02F 1/136209; G06F 3/044
See application file for complete search history.

(56) References Cited

U.S. PATENT DOCUMENTS 7,405,787 B2 * 7/2008 Paukshto .......... G02F 1/133528
349/123
2011/0227851 A1 * 9/2011 Oh ...................... G02F 1/13338
345/173

(Continued)

FOREIGN PATENT DOCUMENTS

CN 103500747 A 1/2014
CN 104330935 A 2/2015

*Primary Examiner* — Thanh Nhan P Nguyen
(74) *Attorney, Agent, or Firm* — Hemisphere Law, PLLC; Zhigang Ma

(57) ABSTRACT

A touch display panel and a touch display device are provided. The touch display panel, comprising an array substrate and a color filter substrate are cell-assembled, and a liquid crystal layer positioned between the array substrate and the color filter substrate. The array substrate includes a first substrate, a black matrix layer, a touch sensing layer, a first electrode layer and a pixel electrode layer are sequentially positioned, the pixel electrode layer is nearby the liquid crystal layer, the first substrate layer is positioned on a side of the pixel electrode which far away the liquid crystal layer. The touch display panel using the first substrate for controlling the touch display panel displays image while touch, the touch electrode field and driving electrode file in the touch display panel are not effect to each other, such that avoids to decrease resolution of touch display panel.

14 Claims, 2 Drawing Sheets

(51) Int. Cl.
    *G06F 3/041*    (2006.01)
    *G06F 3/044*    (2006.01)

(56) References Cited

U.S. PATENT DOCUMENTS

2013/0077034 A1    3/2013    Jung et al.
2015/0022501 A1    1/2015    Kita
2017/0115786 A1*   4/2017    Kimura .................. G06F 3/044

* cited by examiner

TOUCH DISPLAY PANEL AND TOUCH DISPLAY DEVICE

RELATED APPLICATIONS

The present application is a National Phase of International Application Number PCT/CN2018/071349, filed Jan. 4, 2018, and claims the priority of China Application No. 201711053731.2, filed Oct. 31, 2017.

FIELD OF THE DISCLOSURE

The disclosure relates to a touch display technical field, and more particularly to a touch display panel and a touch display device has the touch display panel.

BACKGROUND

With technologies improved every day, display device is widely applied to human's life, and has higher requirement for resolution of display device. Touch display device has fast development, the currently mainstream product using Add on touch panel structure. Therefore, the traditional Add on touch panel has heavy and thick structure, high cost, with requirement of thinning the display device for consumers. In Cell liquid crystal panel become an important direction of touch display filed.

In Cell touch display panel is generally indicating the driving electrode and the sensing electrode are also designed into the inner structure of the liquid crystal cell. In the present In Cell touch display panel, the touch testing function and display function are usually sharing a common electrode, in order to avoid affect the image display effect by the changing the touch voltage, the touch testing function and display function usually alternative changing by time, such that touch driving panel using time sharing driving. For example, while the 60 Hz product driving by time-sharing, in a frame time of 16.7 ms, about 12 ms for displays, 4 ms for achieving touch function. If using the time-sharing to drive touch panel in a frame time, it needs to share partial time for achieving touch function, it causes display time not enough such that display charging cannot be saturated under high resolution. It decreases display property (such as resolution).

SUMMARY

A technical problem to be solved by the disclosure is to provide a touch display panel.

Furthermore, the disclosure further provides a touch display device including the touch display panel.

An objective of the disclosure is achieved by following embodiments. In particular, a touch display panel, comprising an array substrate and a color filter substrate are cell-assembled, and a liquid crystal layer positioned between the array substrate and the color filter substrate, wherein, the array substrate includes a first substrate, a black matrix layer, a touch sensing layer, a first electrode layer and a pixel electrode layer are sequentially positioned, the pixel electrode layer is nearby the liquid crystal layer, the first substrate layer is positioned on a side of the pixel electrode which far away the liquid crystal layer.

In an embodiment, the array substrate further comprises a passivation layer, the passivation layer is positioned between the first electrode layer and the pixel electrode layer.

In an embodiment, the color filter substrate comprises a second substrate and a color layer forming on a surface of the second substrate, the liquid crystal layer is positioned on a color layer which is positioned far away the second substrate.

In an embodiment, the array substrate further comprises an intermediate layer, the intermediate layer is positioned between the touch sensing layer and the first electrode layer.

In an embodiment, the touch display panel further comprises at least one chip, the chip is electrically connecting with the array substrate.

In an embodiment, the array substrate further comprises a first polarizer, the first polarizer is positioned between the first substrate and the black matrix layer.

In an embodiment, the touch display panel further comprises a second polarizer, the second polarizer is positioned on a surface of the second substrate which is far away the color layer.

In an embodiment, a plurality of reflective portion is positioned on the second substrate.

According to another aspect of the disclosure, the disclosure further provides a touch display device. The touch display device includes a backlight assembly and the touch display panel as described above. The backlight assembly is positioned on a side of the color filter substrate which is far away the liquid crystal layer.

According to the touch display panel of this disclosure, user could touch the first substrate for controlling display image of the touch display panel by finger. According to the black matrix layer and the touch sensing layer are positioned on the same side of the liquid crystal layer, and more close to the first substrate which be touched by user than the liquid crystal layer. And the first electrode layer is positioned between the touch sensing layer and the liquid crystal layer for separating the touch electric field generated by touch and the driving electric field generated by driving the liquid crystal layer, the touch electric field and the driving electric field are not effect to each other. Therefore, it enhances charging time of the display for ensuring high resolution of the touch display panel.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

In the following, the touch display panel 100, the touch display screen 200 has the touch display panel 100, and the touch display device 300 has the touch display panel 100 associated with the disclosure will be described with reference to FIG. 1 through FIG. 3, and the embodiments.

Figure 1:
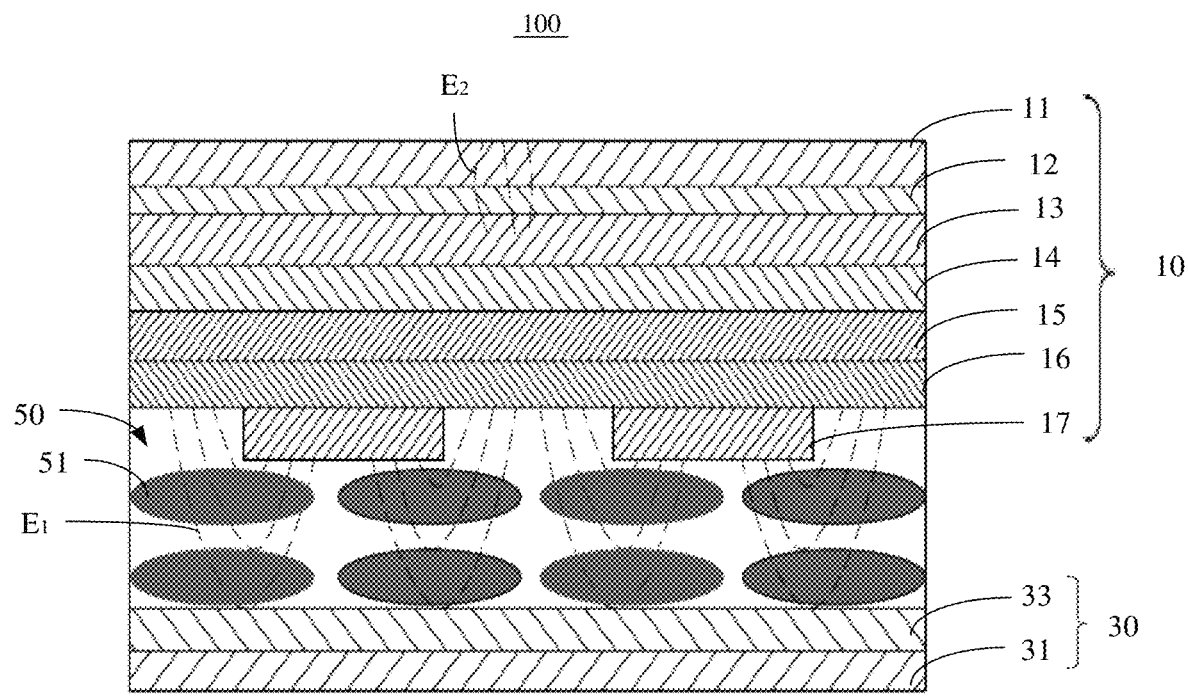
FIG. 1 is a structural schematic view of a touch display panel according to an embodiment of the disclosure.

Please refer to FIG. 1, FIG. 1 is a structural schematic view of a touch display panel according to an embodiment of the disclosure. The touch display panel 100 comprises an array substrate 10 and a color filter substrate 30 are cell-assembled, and a liquid crystal layer 50 is positioned between the array substrate 10 and the color filter substrate 30.

The array substrate 10 includes a first substrate 11, a black matrix (BM) layer 12, a touch sensing layer 13, an intermediate layer 14, a first electrode layer 15 (VCOM), a passivation layer 16 and a pixel electrode layer 17 are sequentially positioned.

In this embodiment, the first substrate 11 is a glass substrate. The touch sensing layer 13 and the pixel electrode layer 17 are both made by material of indium tin oxide (ITO).

In this embodiment, the pixel electrode layer 17 includes a plurality of pixel electrode unit 170 is positioned at interval.

The color filter substrate 30 includes a second substrate 31 and a color layer 33 forming on a surface of the second substrate 31.

The second substrate 31 could be glass substrate, and also could be other material substrate.

The liquid crystal layer 50 is positioned on a side of the pixel electrode layer 17 which is far away the first substrate 11, and positioned on a side of the color layer 33 which is far away the second substrate 31. Specifically, the liquid crystal layer 50 is positioned between the color layer 33 and the pixel electrode layer 17, and the color layer 33 and the region of the passivation layer 16 which is without covering by the pixel electrode layer 17. The liquid crystal layer 50 includes a plurality of the liquid crystal molecular 51.

The pixel electrode layer 17 is providing the driving electric field $E_1$ to the liquid crystal layer 50, and driving the liquid crystal molecular 51 according to potential of the pixel electrode layer 17 such that achieves to display image.

The touch display panel 100 further comprises at least one chip (not shown). In this embodiment, the chip is positioned on surface which has the black matrix layer 12 of the first substrate 11. The chip is electrically connecting with the array substrate 10 for receiving the touch signals.

In another embodiment, the array substrate further comprises a first polarizer (not shown), the first polarizer is positioned between the first substrate 11 and the black matrix layer 12 for decreasing light leakage phenomenon of the touch display panel 100, and increases display contrast and enhances display quality.

In another embodiment, the touch display panel 100 further comprises a second polarizer (not shown), the second polarizer is positioned on a surface of the second substrate 31 which is far away the color layer 33.

In another embodiment, a plurality of reflective portion (not shown) is positioned on the second substrate 31 for changing the transmission route of the light, and enhances luminous rate of the touch display panel 100.

Figure 2:
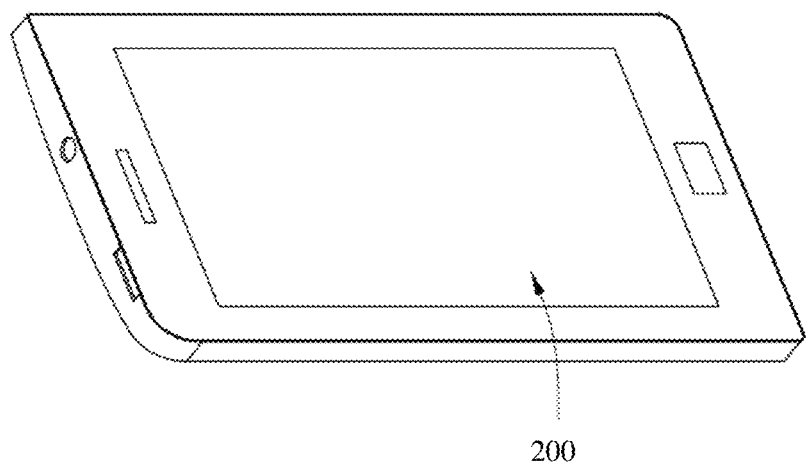
FIG. 2 is a structural schematic view of a touch display device comprises the touch display panel according to an embodiment of the disclosure.

Please refer to FIG. 2, the disclosure further provides a touch display screen 200 has the touch display panel 100 described above, the touch display screen 200 further comprises a backlight assembly (not shown), the backlight assembly is positioned on a side of the color filter substrate 30 which is far away the liquid crystal layer 50. Specifically, the backlight assembly is positioned on surface of the second substrate 31 which is far away the color layer 33.

Please refer to FIG. 2, the disclosure further provides a touch display device 300 has the touch display panel 100 described above. The touch display device 300 could be cell phone, tablet, and television and so on. The touch display device 300 cloud include the touch display screen 200 described above. The touch display screen 200 could be applied to the cell phone, tablet, and television, the touch display device 300 is correspondingly includes the touch display panel 100 and the backlight assembly of the touch display screen 200.

The touch display device 300 further comprises a flexible circuit (not shown). The backlight assembly is positioned on a side of the color filter substrate 30 which is far away the liquid crystal layer 50. Specifically, the backlight assembly is positioned on surface of the second substrate 31 which is far away the color layer 33. The flexible circuit is connecting to the backlight assembly and the second substrate 31, and electrically connecting with the chip.

Figure 3:
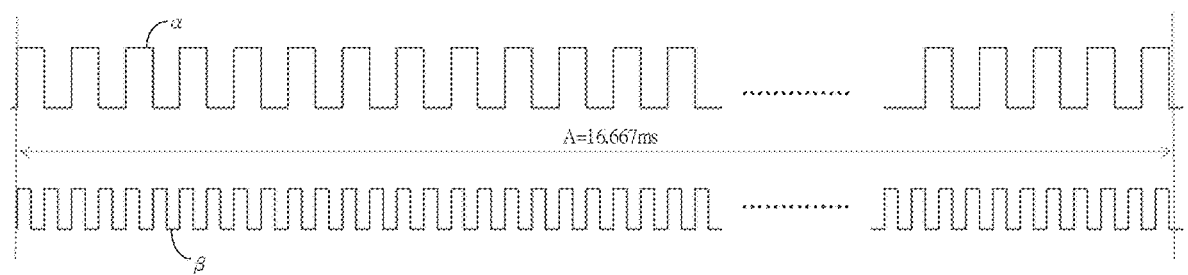
FIG. 3 is a timing diagram of the touch display panel according to an embodiment of the disclosure.

Please refer to FIG. 3, while using the touch display device 300 above, user could touch the first substrate 11 for controlling display image of the touch display panel 100 by finger. According to the black matrix layer 12 and the touch sensing layer 13 are positioned on the same side of the liquid crystal layer 50, and more close to the first substrate 11 which be touched by user than the liquid crystal layer 50. And the first electrode layer 15 is positioned between the touch sensing layer 13 and the liquid crystal layer 50, it causes the touch electric field $E_2$ and the driving electric field $E_1$ are separating by the first electrode layer 15, the touch electric field $E_2$ and the driving electric field $E_1$ are not effect to each other. Therefore, during the time sharing driving touch display panel 100, FIG. 3 is a timing diagram of the touch display panel according to an embodiment of the disclosure. Wherein, A is time of a frame, $\alpha$ is display signal, $\beta$ is touch signal. In each of time of a frame A, touch and display are respectively at the same time, which is while the time of one frame is 16.667 ms, the display time is 16.667 ms, and achieve to the touch function is also 16.667 ms, these two are not be interfered. Therefore, it enhances charging time of the display for ensuring high resolution of the touch display panel 100.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application

What is claimed is:
1. A touch display panel, comprising
an array substrate and a color filter substrate being cell-assembled, and
a liquid crystal layer positioned between the array substrate and the color filter substrate,
wherein, the array substrate includes a first substrate, a black matrix layer, a touch sensing layer, a first electrode layer and a pixel electrode layer which are sequentially positioned, the pixel electrode layer is nearby the liquid crystal layer, the first substrate layer is positioned on a side of the pixel electrode which far away the liquid crystal layer, wherein the color filter substrate comprises a second substrate and a color layer which is formed on a surface of the second substrate and contacted with the liquid crystal layer directly.

2. The touch display panel according to claim 1, wherein the array substrate further comprises a passivation layer, and the passivation layer is positioned between the first electrode layer and the pixel electrode layer.

3. The touch display panel according to claim 1, wherein the array substrate further comprises an intermediate layer, and the intermediate layer is positioned between the touch sensing layer and the first electrode layer.

4. The touch display panel according to claim 1, wherein the touch display panel further comprises at least one chip, and the chip is electrically connecting with the array substrate.

5. The touch display panel according to claim 1, wherein the array substrate further comprises a first polarizer, and the first polarizer is positioned between the first substrate and the black matrix layer.

6. The touch display panel according to claim 1, wherein the touch display panel further comprises a second polarizer, and the second polarizer is positioned on a surface of the second substrate which is far away the color layer.

7. The touch display panel according to claim 1, wherein a plurality of reflective portion is positioned on the second substrate.

8. A touch display device, comprising a backlight assembly and a touch display panel, wherein the touch display panel comprises an array substrate and a color filter substrate being cell-assembled, and a liquid crystal layer is positioned between the array substrate and the color filter substrate, wherein, the array substrate includes a first substrate, a black matrix layer, a touch sensing layer, a first electrode layer and a pixel electrode layer which are sequentially positioned, the pixel electrode layer is nearby the liquid crystal layer, the first substrate layer is positioned on a side of the pixel electrode which far away the liquid crystal layer; the backlight assembly is positioned on a side of the color filter substrate which is far away the liquid crystal layer,
wherein the color filter substrate comprises a second substrate and a color layer which is formed on a surface of the second substrate and contacted with the liquid crystal layer directly.

9. The touch display device according to claim 8, wherein the array substrate further comprises a passivation layer, and the passivation layer is positioned between the first electrode layer and the pixel electrode layer.

10. The touch display device according to claim 8, wherein the array substrate further comprises an intermediate layer, and the intermediate layer is positioned between the touch sensing layer and the first electrode layer.

11. The touch display device according to claim 8, wherein the touch display panel further comprises at least one chip, and the chip is electrically connecting with the array substrate.

12. The touch display device according to claim 8, wherein the array substrate further comprises a first polarizer, and the first polarizer is positioned between the first substrate and the black matrix layer.

13. The touch display device according to claim 8, wherein the touch display panel further comprises a second polarizer, and the second polarizer is positioned on a surface of the second substrate which is far away the color layer.

14. The touch display device according to claim 8, wherein a plurality of reflective portion is positioned on the second substrate.

* * * * *